(12) United States Patent
Baker et al.

(10) Patent No.: US 7,554,531 B2
(45) Date of Patent: Jun. 30, 2009

(54) ANNULAR POTENTIOMETRIC TOUCH SENSOR

(75) Inventors: Jeffrey R. Baker, Thousand Oaks, CA (US); Carlos S. Sanchez, Oxnard, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 741 days.

(21) Appl. No.: 11/292,590

(22) Filed: Dec. 2, 2005

(65) Prior Publication Data

US 2006/0082556 A1 Apr. 20, 2006

Related U.S. Application Data

(63) Continuation-in-part of application No. 11/129,805, filed on May 16, 2005, now Pat. No. 7,310,089.

(60) Provisional application No. 60/572,155, filed on May 18, 2004.

(51) Int. Cl.
*G06F 3/041* (2006.01)
(52) U.S. Cl. ........................ 345/173; 345/174
(58) Field of Classification Search ................. 345/156, 345/173
See application file for complete search history.

(56) References Cited

U.S. PATENT DOCUMENTS

| | | |
|---|---|---|
| 4,264,903 A | 4/1981 | Bigelow |
| 4,482,883 A | 11/1984 | Heredero |
| 4,494,105 A | 1/1985 | House |
| 4,719,524 A | 1/1988 | Morishima et al. |
| 4,736,191 A | 4/1988 | Matzke et al. |
| 4,777,328 A | 10/1988 | Talmage, Jr. et al. |
| 5,151,677 A | 9/1992 | Gernet et al. |
| 5,159,159 A | 10/1992 | Asher |
| 5,353,004 A | 10/1994 | Takemoto et al. |
| 5,689,285 A * | 11/1997 | Asher .......................... 345/161 |
| 5,889,236 A | 3/1999 | Gillespie et al. |
| 5,923,388 A | 7/1999 | Kurashima et al. |
| 5,952,912 A | 9/1999 | Bauer et al. |
| 7,046,230 B2 * | 5/2006 | Zadesky et al. ............. 345/156 |
| 2004/0224638 A1 | 11/2004 | Fadell et al. |
| 2004/0252109 A1 | 12/2004 | Trent, Jr. et al. |
| 2005/0052425 A1 | 3/2005 | Zadesky et al. |
| 2005/0110768 A1 | 5/2005 | Marriott et al. |

\* cited by examiner

*Primary Examiner*—Alexander Eisen
*Assistant Examiner*—Robin Mishler
(74) *Attorney, Agent, or Firm*—Brooks Kushman P.C.

(57) ABSTRACT

The present invention determines angular position using a potentiometric touch sensor. The sensor has an annular pattern of resistive material on a portion of a bottom substrate top surface. Conductive drive lines and fixed potential conductive traces radially traverse the bottom substrate top surface and are electrically coupled to the resistive material. Conductive sense traces radially traverse the bottom substrate top surface. A conductive layer on a bottom surface of a top substrate is positioned above the bottom substrate top surface. A pressure applied to the top substrate and/or the bottom substrate electrically couples a portion of a conductive sense trace to a portion of the annular pattern and/or a fixed potential conductive trace. The angular position of the applied pressure is determined by measuring at least one electrical parameter between a conductive drive line and a conductive sense line having the conductive sense traces.

19 Claims, 7 Drawing Sheets

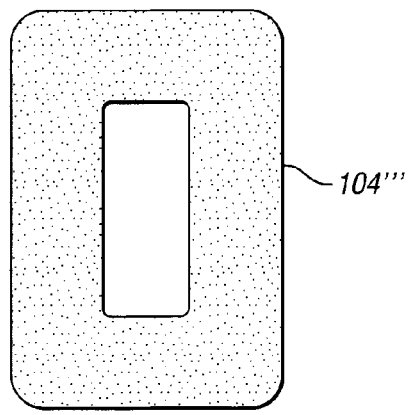
Fig. 5c
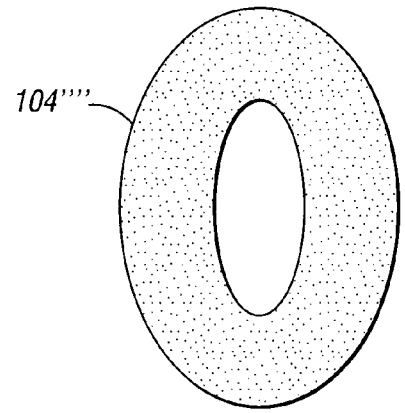
Fig. 5d
Fig. 5e
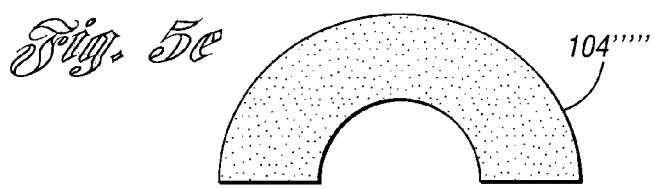
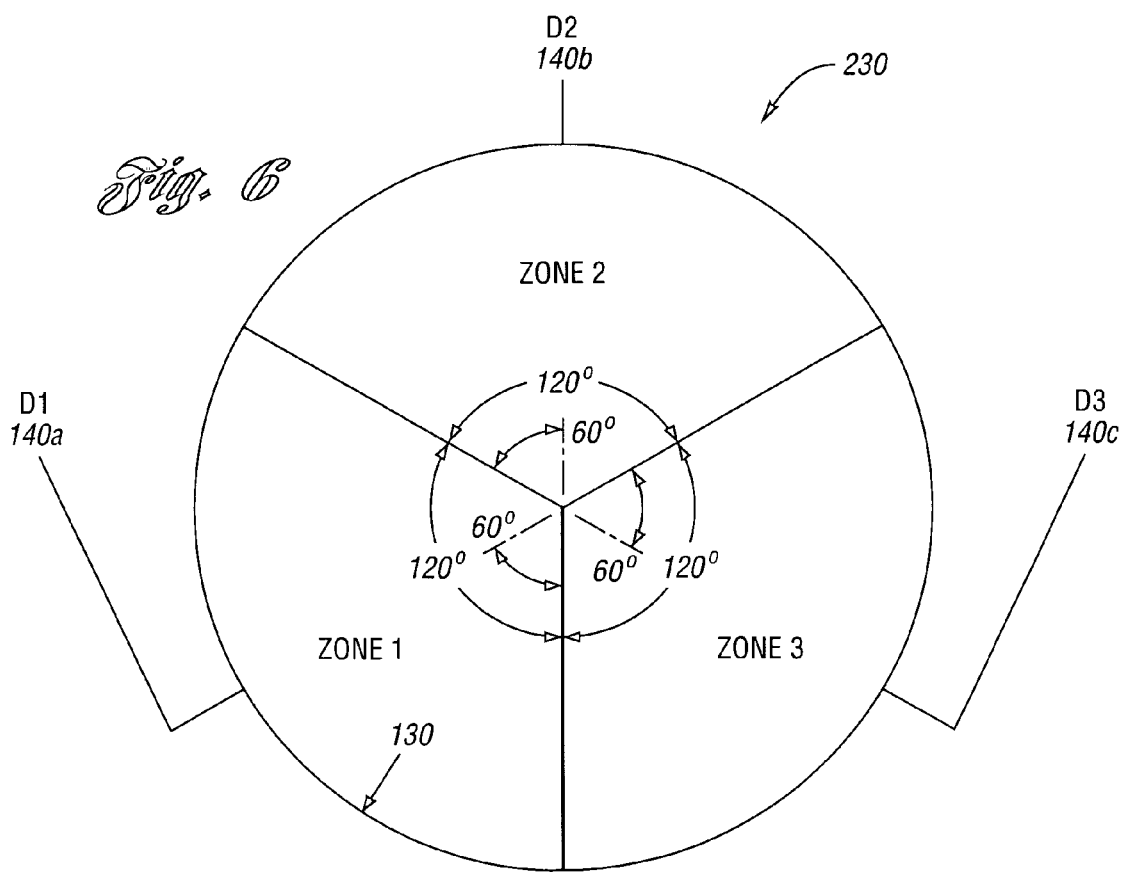
Fig. 6

ANNULAR POTENTIOMETRIC TOUCH SENSOR

CROSS-REFERENCE TO RELATED APPLICATIONS

This application is a continuation-in-part of U.S. application Ser. No. 11/129,805, filed May 16, 2005, now U.S. Pat. No. 7,310,089, which is hereby incorporated by reference in its entirety. U.S. application Ser. No. 11/129,805, in turn, claims the benefit of U.S. provisional application Ser. No. 60/572,155, filed May 18, 2004, which is hereby incorporated by reference in its entirety.

BACKGROUND OF THE INVENTION

1. Field of the Invention

The present invention relates to angular position sensors typically used as an input device for electronics having a graphical user interface.

2. Background Art

Angular input sensors, known as scroll wheels, scroll rings, jog wheels and the like, are intuitive input devices often used with a graphical user interface (GUI) for choosing between items that can be arrayed in some sense one-dimensionally, such as a list, or arrayed circularly, such as a list that wraps around. Selectable options or choices may be discrete, such as channels on a TV, or continuous, such as audio volume. Scroll wheels often consist of a flat disk or wheel. In use, a user touches the face or edge of the disk and rotates the disk in order to manipulate choices in the GUI.

Angular input sensors can be constructed as a touch sensitive annular surface. One example is the Apple iPod, a portable music player. A ring-shaped capacitive sensor on the face of the iPod reports the angular position of a finger touch, which in turn is used to manipulate menus on an LCD display.

To be useful in hand-held portable electronics, such angular sensors must meet severe space and power consumption requirements. Ideally, the sensor is measurable by a small microcontroller. To conserve scarce battery power the sensor should be compatible with waking the microcontroller from a low power sleep mode by a user's touch, as opposed to requiring the microcontroller to frequently wake and actively check for a touch. Angular sensors should be inexpensive, easy to manufacture and easily manufactured into an end product. Preferably, the design should be adaptable into a variety of shapes besides a simple circular ring.

SUMMARY OF THE INVENTION

According to an embodiment of the present invention, an annular touch sensor is provided. The touch sensor comprises a bottom substrate, an annular pattern of resistive material, a plurality of conductive drive lines, a plurality of fixed potential conductive traces, a conductive sense line having a plurality of conductive sense traces, a top substrate, and a conductive layer. The annular pattern of resistive material traverses a portion of a top surface of the bottom substrate. Each conductive drive line radially traverses the top surface of the bottom substrate so as to electrically couple with the annular pattern of resistive material. Each fixed potential conductive trace radially traverses the top surface of the bottom substrate and electrically couples with the annular pattern of resistive material. Each sense trace is electrically decoupled from the annular pattern of resistive material, the fixed potential conductive traces, and the drive lines when the sensor is untouched. Each sense trace radially traverses the top surface of the bottom substrate. The top substrate is spaced above the top surface of the bottom substrate. The conductive layer is on a bottom surface of the top substrate and is positioned above one or more of the annular pattern, the fixed potential conductive traces, and the conductive sense traces. A pressure applied to at least one of the top substrate and the bottom substrate electrically couples a portion of one or more of the conductive sense traces to a portion of at least one of the annular pattern and one or more of the fixed potential conductive traces.

According to another embodiment of the present invention, a method of determining an angular position of an applied pressure on a touch sensor is provided. The touch sensor has a top substrate including a conductive layer, and a bottom substrate including an annular pattern of resistive material, a plurality of fixed potential conductive traces electronically coupled to the annular pattern of resistive material, a plurality of conductive drive lines intersecting the annular pattern of resistive material, and a conductive sense line having a plurality of conductive sense traces. The method comprises the steps of determining a conductive drive line closest to the applied pressure, applying a potential across a first remote conductive drive line and a second remote conductive drive line, measuring a sense voltage between the conductive sense line and one of the first and second remote conductive drive lines, and determining an angular position of the applied pressure about the touch sensor using the sense voltage. The first and second remote conductive drive lines are electronically distinct from the conductive drive line closest to the applied pressure According to yet another embodiment of the present invention, a method of determining an angular position of an applied pressure on an annular touch sensor is provided. The touch sensor has a top substrate including a conductive layer, and a bottom substrate including an annular pattern of resistive material, a plurality of fixed potential conductive traces electronically coupled to the annular pattern of resistive material, a plurality of conductive drive lines intersecting the annular pattern of resistive material, and a conductive sense line having a plurality of conductive sense traces. The method comprises the steps of measuring a first voltage between the conductive sense line and a first conductive drive line, measuring a second voltage between the conductive sense line and a second conductive drive line, measuring a third voltage between the conductive sense line and a third conductive drive line, determining a conductive drive line closest to the applied pressure, electronically disconnecting the conductive drive line closest to the applied pressure, applying a potential across a first remote conductive drive line and a second remote conductive drive line, measuring a sense voltage between the conductive sense line and one of the first and second remote conductive drive lines, and determining an angular position of the applied pressure about the annular touch sensor using the sense voltage.

The conductive drive line closest to the applied pressure is determined using the first voltage, the second voltage and the third voltage. The conductive drive line closest to the applied pressure, the first remote conductive drive line, and the second remote conductive drive line are selected from a group consisting of the first conductive drive line, the second conductive drive line, and the third conductive drive line.

The above objects and other objects, features and advantages of the present invention are readily apparent from the following detailed description when taken in connection with the accompanying drawings.

BRIEF DESCRIPTION OF THE DRAWINGS

FIG. 6 is a schematic diagram of a sensor including three drive lines according to an embodiment of the present invention;

DETAILED DESCRIPTION

Figure 1:
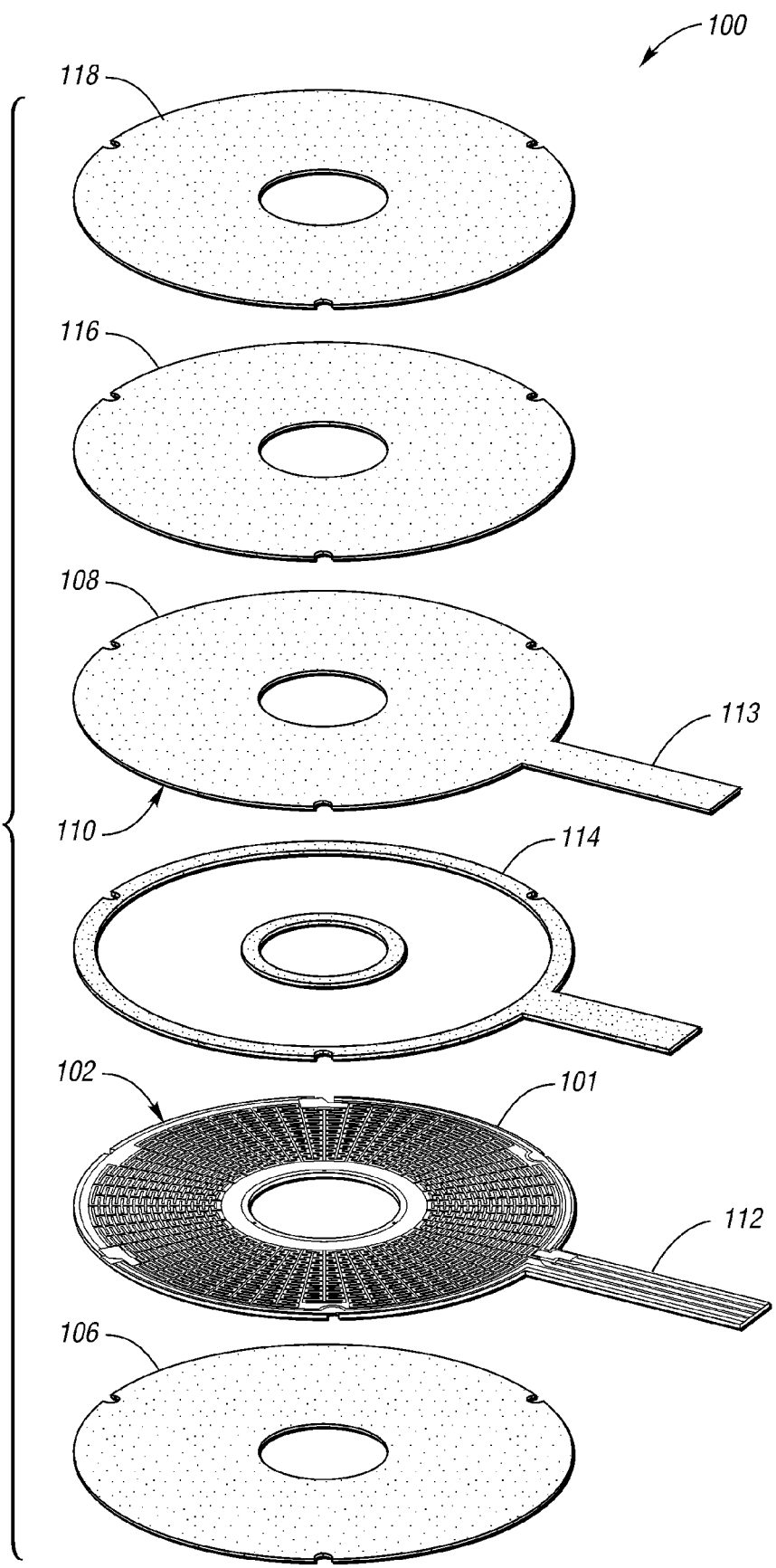
FIG. 1 is an exploded view drawing of a sensor according to an embodiment of the present invention.

Referring to FIG. 1, an exploded view drawing of a sensor 100 according to an embodiment of the present invention is shown. The sensor 100 is a planar annulus potentiometric sensor 100 for determining the angular location of a touch. The sensor 100 is "planar" in the sense that while it may be many tens of millimeters across, it is only approximately 0.5 mm thick. The sensor 100 is annular since it may comprise a ring or a partial arc of a ring. The sensor 100 is "potentiometric" in that it contains a resistive element across which a potential is placed and a sense element that contacts (i.e., electrically couples to) the resistive element such that the voltage seen by the sense element is proportional to (i.e., corresponds to) the location of the contact. The sensor 100 is a "touch" sensor in that its size and operational force range are suitable for the detection of light human finger force.

In general, the sensor 100 comprises a plurality of layers. A bottom substrate 102 (shown in detail in FIG. 4a), which may be flexible or rigid, is deposited on its inside or top surface with an annular resistive material 104. The annular resistive material (i.e., annular pattern of resistive material) 104 generally occupies (i.e., traverses) a portion (e.g., a partial width) of the top surface and may be positioned proximate an edge, such as an inner radius 103 of the bottom substrate 102.

Two or more conductive drive lines 140 (e.g., 140a-140c) intersect (i.e., electrically couple to) the resistive material 104, such as by traversing the resistor element 104. The conductive drive lines 140 may be fabricated from a highly conductive material. In at least one embodiment, the conductive drive lines 140 are spaced substantially equidistant about the annular resistive material 104.

A set of fixed potential conductive traces 105 extend from the resistive material 104 toward an outer radius 101 of the bottom substrate 102 and are generally electrically coupled to the resistive material 104.

A set of electronically coupled conductive sense traces are generally interleaved with the set of fixed potential conductive traces 105. The conductive sense traces are generally electrically coupled to a conductive wire (i.e., lead) and the combination of the conductive sense traces and the wire may be generally referred to as a conductive sense line (i.e., sense line) 130. Where the sense line 130 crosses a drive line 140 (i.e., a crossover point), a dielectric spacer 141 may be positioned between the sense 130 and drive 140 lines such that the sense 130 and drive 140 lines are electrically decoupled (shown in detail in FIGS. 4b-4d). A crossover layer 143 of conductive or partially conductive material may be deposited over the dielectric spacer 141 such that electrical continuity of the sense line 130 and/or drive line 140 is maintained at the crossover point.

The bottom substrate 102 may include a pigtail extension 112. The pigtail extension 112 may include electrical traces for making electrical contact with one or more drive lines 140, one or more sense lines 130, and/or other elements of the sensor 100 as will be further described below. The end of the pigtail extension 112 may include a connector (not shown) or the pigtail 112 may be directly inserted into a connector as is known in the art. Other schemes for making electrical connections with the sensor 100 are also possible.

When a drive voltage is placed across two or more drive lines 140, the electric potential of a fixed potential conductive trace 105 generally corresponds to the drive voltage and the physical location of the trace 105.

In at least one embodiment of the present invention, the resistive material 104 and the fixed potential conductive traces 105 comprise polymer thick film carbon ink, and the sense line 130, drive lines 140, and crossover layer 143 comprise at least one of silver based polymer thick film ink and nickel/silver based polymer thick film ink. However, the resistive material 104, fixed potential conductive traces 105, sense line 130, drive lines 140, and crossover layer 143 each may be any appropriate conductive or partially conductive material to meet the design criteria of a particular application, such as a polymer thick film carbon ink, silver based polymer thick film ink, nickel/silver based polymer thick film ink, and/or the like.

A flexible top substrate 108 may be deposited on its inside or bottom surface with a conductive or partially conductive layer 110. This conductive layer 110 is analogous to the wiper of a mechanical potentiometer. The conductive layer 110 may be deposited as any appropriate pattern to meet the design criteria of a particular application, such as a solid pattern or meshed with a grid pattern. The conductive layer 110 is typically a silver polymer thick film, but may be carbon ink or other conductive or partially conductive material. In at least one embodiment of the present invention, the top substrate 108 includes a section 113 (i.e., a pigtail cover) that may act to enclose the pigtail 112.

The bottom substrate 102 and the flexible top substrate 108 may be held together at the inner 103 and outer 101 radii of the annulus by an adhesive spacer layer 114. The spacer layer 114 is thick enough to prevent the inner faces of the top 108 and bottom 102 substrates from contacting except when the flexible top substrate 108 or bottom substrate 102 is touched by a user (not shown). In at least one embodiment of the present invention, the pigtail cover 113 may be adhered to the pigtail 112 via the spacer layer 114.

The spacer 114 may comprise any appropriate material capable of both separating and adhering the top 108 and bottom 102 substrates, such as a screen printed pressure sensitive adhesive, a film pressure sensitive adhesive, and the like. In at least one embodiment of the present invention, the adhesive spacer layer 114 has a thickness substantially between 0.002 inches and 0.013 inches. However, the adhesive spacer layer 114 may have any appropriate thickness to meet the design criteria of a particular application.

In an untouched state, the fixed potential conductive traces 105 are electrically decoupled from the conductive sense traces 130. When the top substrate 108 is pressed against the bottom substrate 102, the fixed potential conductive traces 105 are generally electrically coupled to the conductive sense line 130.

The sensor 100 may include a rear or bottom adhesive 106 for attaching the sensor 100 to a host device (not shown) such as a printed circuit board.

The sensor 100 may also include a top adhesive layer 116 onto which may be attached a top (i.e., outer) protective layer 118. In at least one embodiment of the present invention, the top protective layer 118 is clear such that a graphic (e.g., a specific color, pattern, logo and/or the like) may be viewed through the protective layer 118. In at least one other embodiment, the top protective layer 118 may comprise a graphic (i.e., a specific color, pattern, logo and/or the like) on an outside surface of the protective layer 118. In yet at least one other embodiment, the top protective layer 118 may comprise an actuator layer such as a metallized silicone keypad membrane. In still yet at least one other embodiment, the top protective layer 118 may comprise an active light emitting layer, such as an electroluminescent lamp, an organic light emitting polymer lamp and/or the like. However, the top protective layer 118 may comprise any appropriate material to meet the design criteria of a particular application.

In at least one embodiment, the sensor 100 may include a rigid bottom substrate 102 comprising printed circuit board (i.e., PCB) material, such as FR4. Optionally, one or more traces (e.g., 105, 130, 140a, 140b, 140c, and/or the like) may be contemporaneously fabricated on the rigid bottom substrate 102. Furthermore, one or more traces (e.g., 105, 130, 140a, 140b, 140c, and/or the like) may be copper optionally treated to prevent oxidation using gold or tin plating.

One or more crossover points may be eliminated in an embodiment of the present disclosure by using a two-sided PCB and plated conductive vias.

In at least one embodiment, connection to a host device (i.e., a host circuit) (not shown) may be via a flex circuit tail (e.g., the pigtail extension 112) that is soldered to a side (e.g., a back side) of the PCB, by a board-to-board connector (not shown) soldered to a side of the PCB, by using a host device PCB (not shown) as the rigid bottom substrate 102 as disclosed in the commonly assigned U.S. Pat. No. 6,909,354 issued Jun. 21, 2005 and incorporated by reference in its entirety, and/or by any other appropriate coupling apparatus.

The description of the present invention uses spatial references such as top and bottom for clarity only. The sensor 100 may be used in any orientation. Further, while the sensor 100 is generally described as operating with a touch on the top substrate 108 pushing the top substrate 108 onto the bottom substrate 102, the sensor 100 will also operate with a touch on the bottom substrate 102 pushing the bottom substrate 102 into contact with the top substrate 108.

Figure 2:
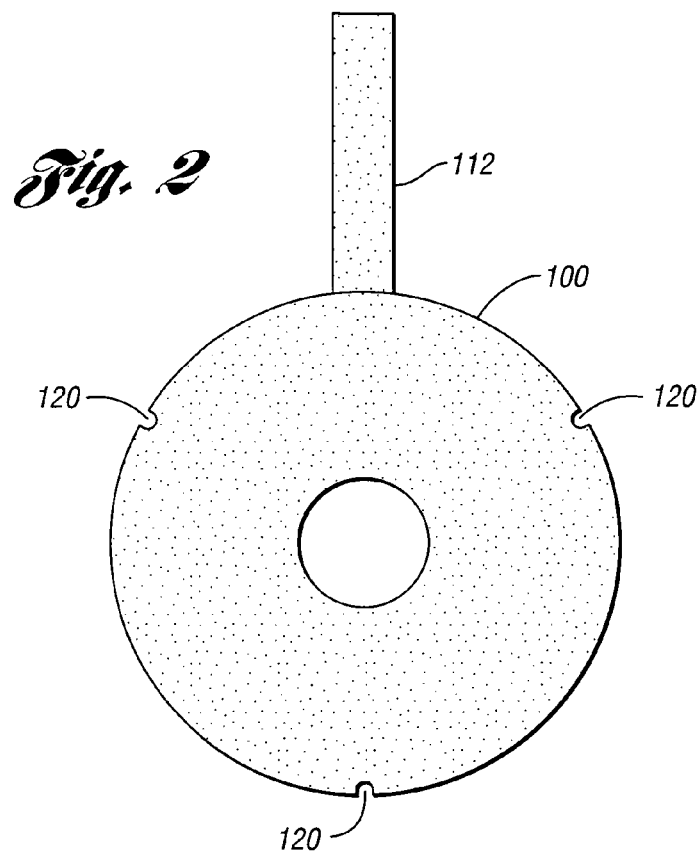
FIG. 2 is a top view drawing of a sensor according to an embodiment of the present invention.

Referring now to FIG. 2, a top view drawing of a sensor 100 according to an embodiment of the present invention is shown. The three notches 120 are for alignment with the host device. The tail 112 is for connection of the sensor 100 to a circuit of the host device. To simplify construction of the sensor 100, the tail 112 may be built from a single layer, generally the bottom layer 102, and may have conductors that face upwards and/or downwards.

Figure 3:
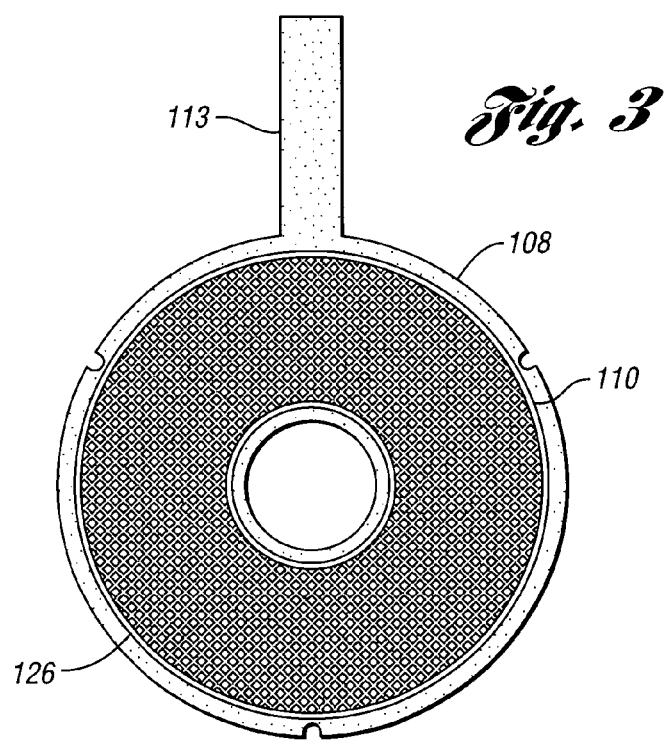
FIG. 3 is a bottom view of a top substrate according to an embodiment of the present invention.

Referring now to FIG. 3, a bottom view of a top substrate 108 according to an embodiment of the present invention is shown. In the embodiment shown, a fine grid of conductive or partially conductive traces 126 forms the conductive layer 110 that is pushed against the bottom substrate 102 when the sensor 100 is touched. However, as will be appreciated by one of ordinary skill in the art, the conductive layer 110 may comprise any appropriate arrangement of conductive and/or partially conductive materials to meet the design criteria of a particular application, such as a continuous coating of conductive and/or partially conductive material.

In at least one embodiment of the present invention, the top substrate 108 is a flexible polymer sheet such as PET, polyimide, or other film material. In at least one other embodiment of the present invention, the top substrate comprises a slightly rigid material such as polycarbonate, thin metal, or thin circuit board material. However, the top substrate 108 may comprise any appropriate material to meet the design criteria of a particular application.

Referring now to FIGS. 4 (a-d), top views of a bottom substrate 102 having three drive lines 140 according to an embodiment of the present invention is shown. As illustrated in FIG. 4a, three drive lines (140a-140c) may be spaced at substantially 120 degree intervals around the resistive ring 104. Conductive traces for the drive lines 140 and/or a sense line 130 may extend down the pigtail 112.

A dielectric spacer 141 may be implemented to electronically decouple one or more drive lines 140 from one or more sense lines 130 at one or more crossover points (i.e., where a drive line 140 crosses a sense line 130 on the top surface of the bottom substrate 102). The implementation of a dielectric spacer 141 is generally illustrated according to one embodiment of the present invention by FIGS. 4 (b-d).

Figure 4A:
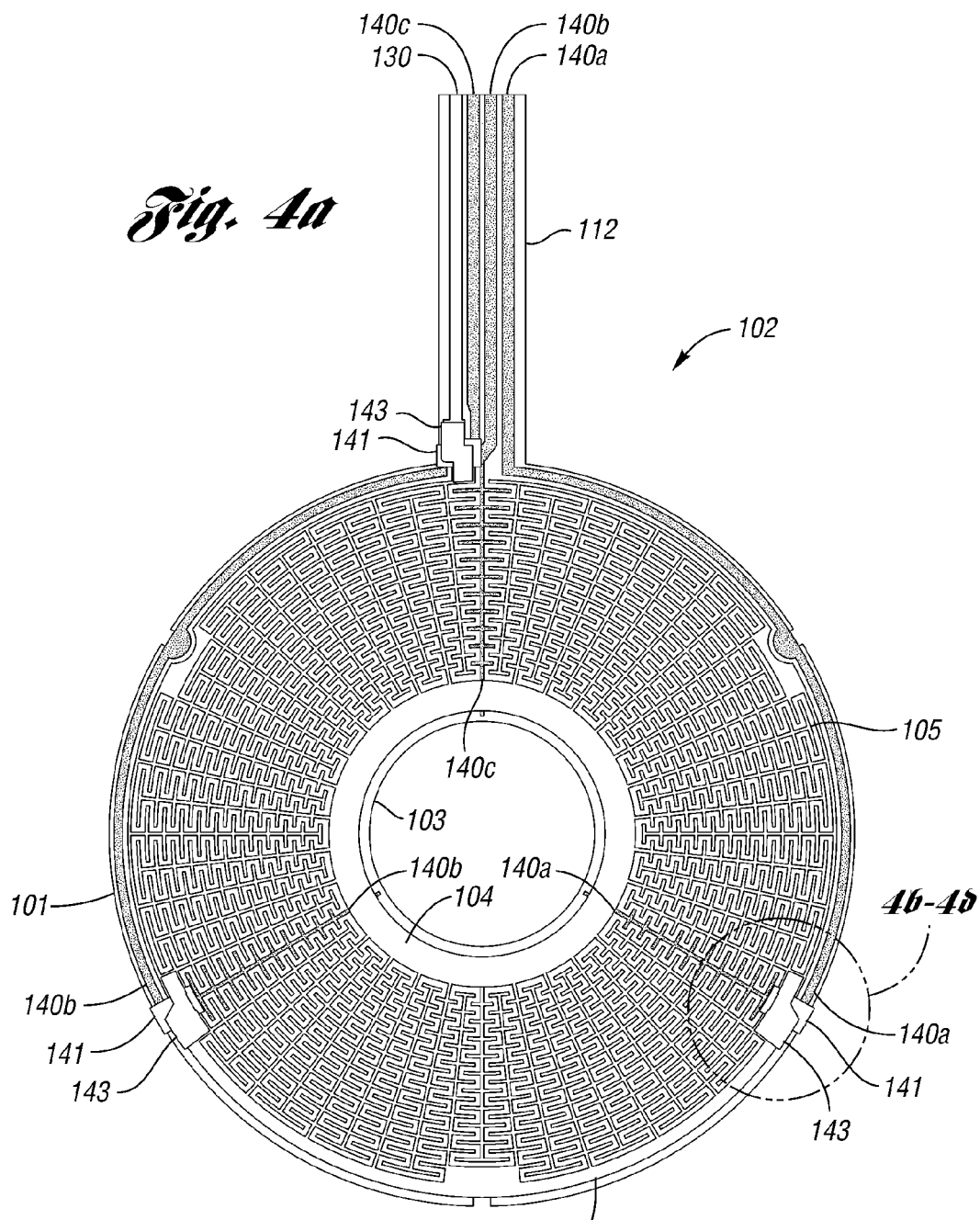
FIGS. 4 (a-d) are top views of a bottom substrate having three drive lines according to an embodiment of the present invention.
Figure 4B:
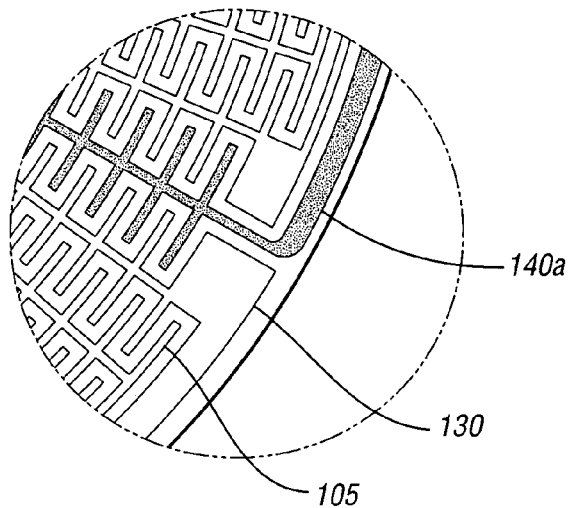
Figure 4C:
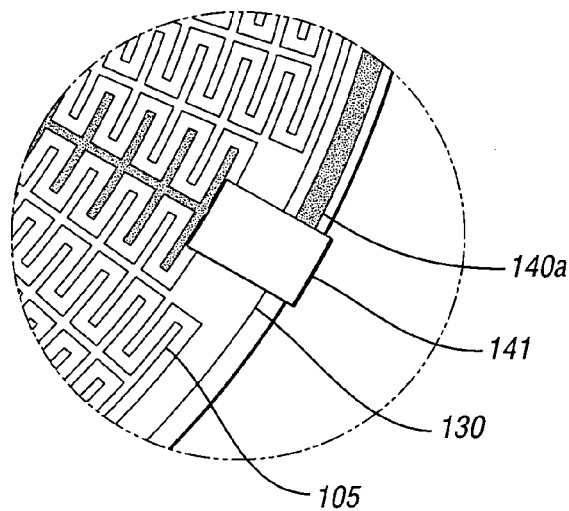
Figure 4D:
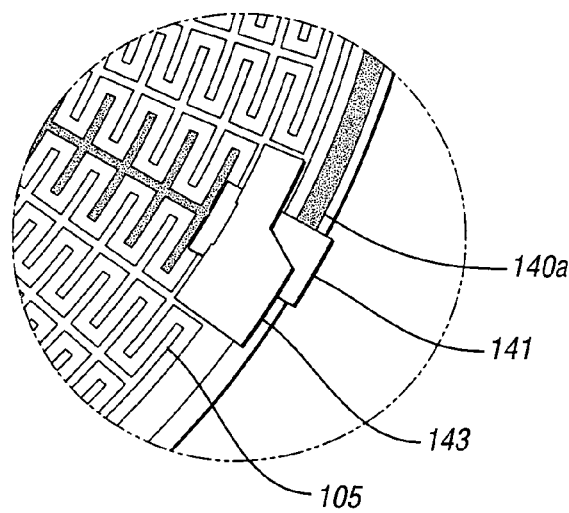

Referring to FIGS. 4a and 4b, the drive lines 140 (e.g., 140a), the annular resistive material 104, the fixed potential conductive traces 105, and non-crossing sections of the sense line 130 may be deposited on a single layer of the bottom substrate 102. As illustrated in FIG. 4c, a dielectric spacer 141 may be deposited over a drive line 140 at a crossover point. As illustrated in FIG. 4d, a crossover layer 143 of conductive or partially conductive material may be deposited over the dielectric spacer 141 such that electrical continuity of the sense line 130 is maintained at the crossover point.

It should be noted that the sense line 130 and non-crossing sections of the drive line 140 may be deposited on a single layer of the bottom substrate 102. Accordingly, a dielectric spacer 141 may be deposited over the sense line 130 at a crossover point, and the crossover layer 143 may be deposited over the dielectric spacer 141 such that electrical continuity of the drive line 140 is maintained.

Furthermore, one or more crossover points may be added or eliminated by alternative positioning of one or more components (e.g., a sense line 130, a drive line 140, etc.) of the bottom substrate 102.

Figure 5A:
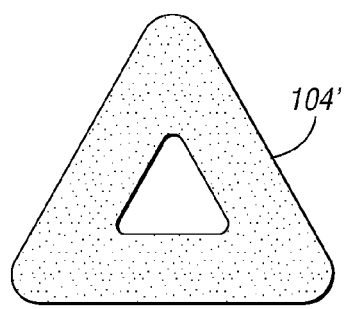
FIGS. 5 (a-e) are schematic diagrams of annular patterns of resistive material according to embodiments of the present invention.
Figure 5B:
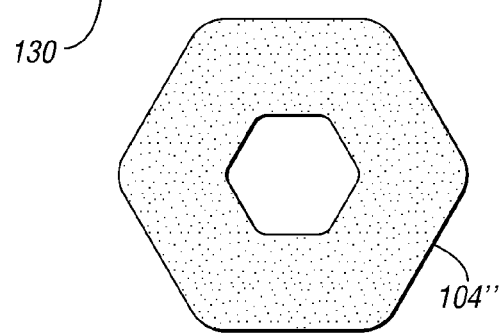

Referring now to FIGS. 5 (a-e), schematic diagrams of annular patterns of resistive material (104'-104''''') according to embodiments of the present invention are shown. In addition to a round or circular pattern of resistive material 104, a wide variety of annular shapes may be used. FIG. 5a illustrates a triangular annular region 104'. FIG. 5b illustrates a hexagonal annular region 104''. FIG. 5c illustrates a rectangular annular region 104'''. FIG. 5d illustrates an ovoid annular region 104''''. FIG. 5e illustrates a semicircular annular region 104'''''. Accordingly, a wide variety of resistive patterns may be used with the present invention.

Referring now to FIG. 6, a schematic diagram 230 of a sensor 100 including three drive lines 140 according to an embodiment of the present invention is shown. As illustrated, the sensor 100 may be a four wire device. The circle generally represents the bottom substrate 102. In the embodiment shown, the drive lines 140 are separated by substantially 120 degrees of arc.

It has been observed that a touch (i.e., touch point, pressure, applied pressure) that is within a range of about five degrees of a drive line 140 may be indistinguishable from a touch at the drive line 140. That is, each drive line 140 generally has a dead zone (e.g., ten degrees) centered around the drive line 140. However, negative affects of the dead zones may be minimized and/or eliminated by driving (i.e., placing a potential across) the two drive lines 140 located the farthest from the touch point. A method of using three drive lines 140 to eliminate negative affects of the dead zones is described further in connection with the flow chart shown in FIG. 9.

Figure 7:
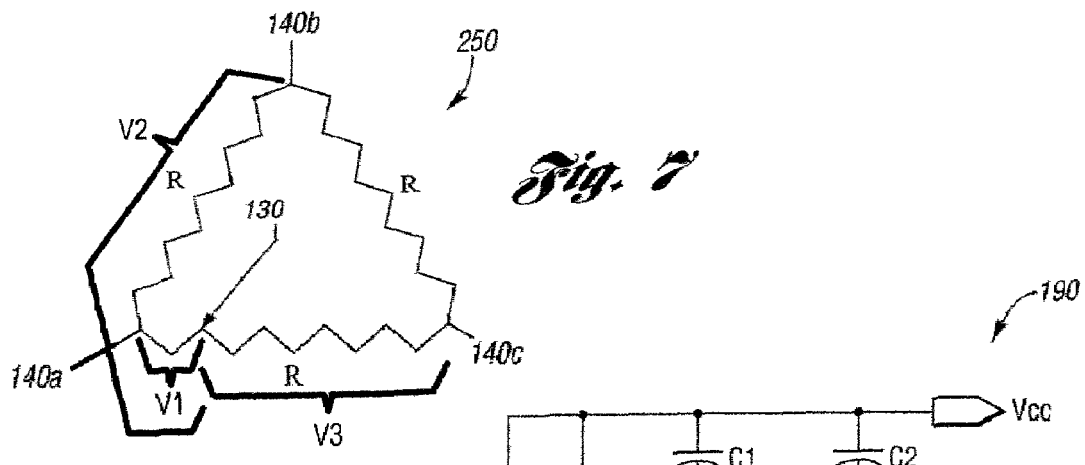
FIG. 7 is a schematic diagram of a resistor model for the senor of FIG. 6.

Referring now to FIG. 7, a schematic diagram of a resistor model 250 for the sensor 100 of FIG. 6 is shown. The bottom substrate 102 is illustrated as resistors. A resistance between any two adjacent drive lines 140 may be defined as R. A touch point is generally indicated by an arrow.

Figure 8:
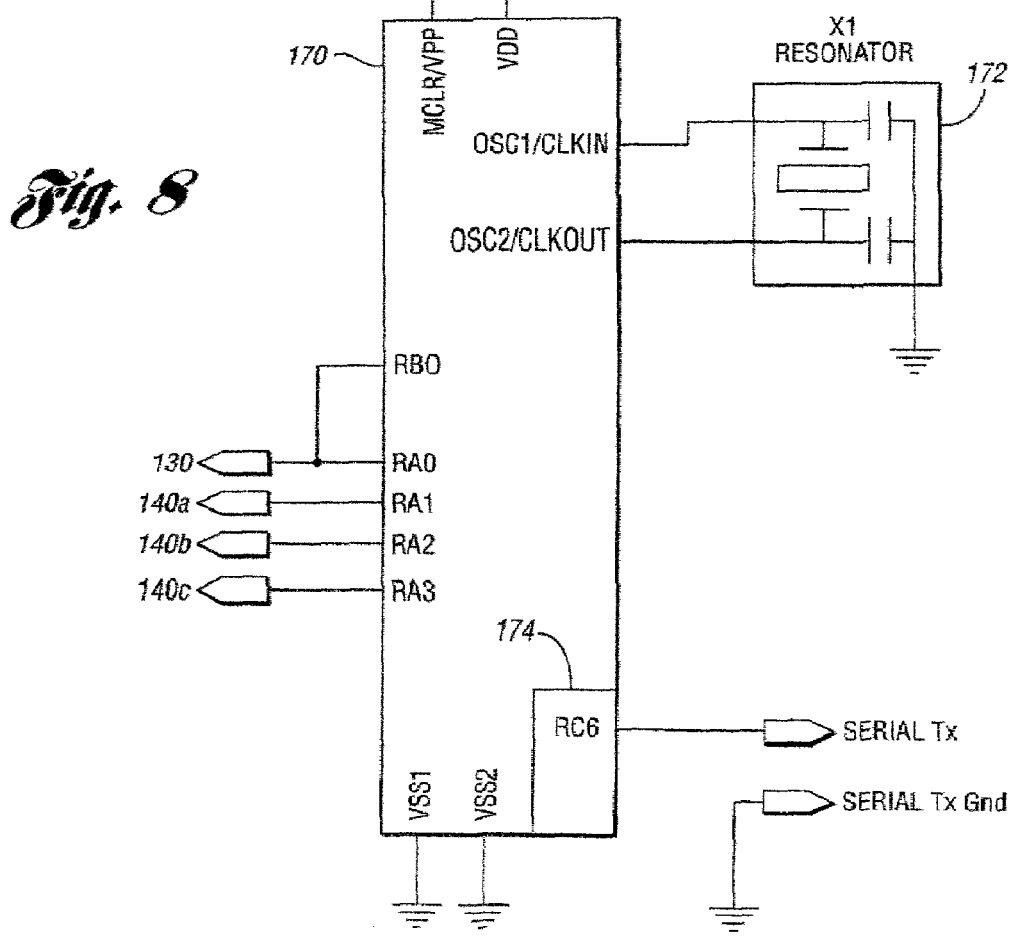
FIG. 8 is a schematic diagram of a processor according to an embodiment of the present invention.

Referring now to FIG. 8, a schematic diagram 190 of a processor 170 according to an embodiment of the present invention is shown. Logic may be implemented in a microprocessor for determining the touch location (i.e., an angular position of a pressure asserted on the sensor 100). The system 190 may include clock circuitry 172, serial communication circuitry 174, and the like as is commonly used with microcontrollers. In the embodiment shown, the microcomputer includes an analog-to-digital converter (ADC) input line (i.e., RA0) for the sense line 130. Either the ADC line is capable of driving current or a separate drain, shown in FIG. 8 as pin RB0, may be used. The drain line (RB0) is configurable as a high-impedance input so that it may be effectively removed from the circuit. In addition, three lines (i.e., RA1-RA3) are used for driving the drive lines 140 (i.e., 140*a*-104*c*). Each of the three lines maybe independently configurable output high, output low or high-impedance input.

Figure 9:
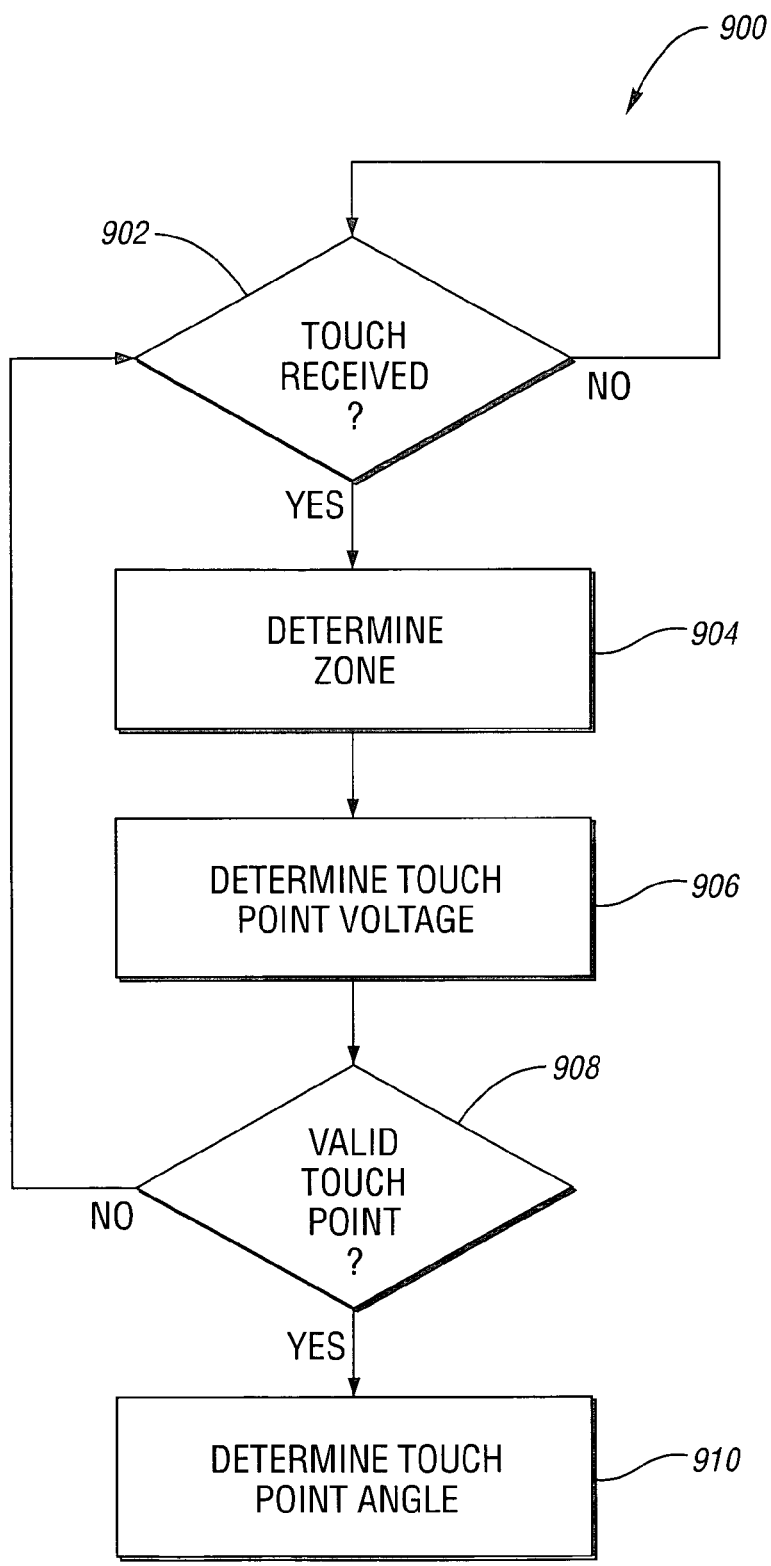
FIG. 9 is a flow diagram of a method for calculating angular position of pressure applied to a sensor with three drive lines according to an embodiment of the present invention.

Referring now to FIG. 9, a flow diagram of a method 900 for calculating angular position of pressure applied to a sensor (e.g., the sensor 100) with three drive lines (e.g., 140*a*-140*c*) according to an embodiment of the present invention is shown. As will be appreciated by one of ordinary skill in the art, the operations illustrated in the flow diagram 900 are not necessarily sequential operations. The order of steps may be modified within the spirit and scope of the present invention. The present invention transcends any particular implementation and the embodiment is shown in sequential flow chart form for ease of illustration.

The method 900 may be described with regard to the sensor 100 illustrated in FIG. 6 as schematic diagram 230. The sensor 100 may be logically divided into three zones. Zone 1 may be defined as a 120 degree arc centered around drive line 140*a* (i.e., D1). Zone 2 may be defined as a 120 degree arc centered around drive line 140*b* (i.e., D2). Similarly, zone 3 may be defined as a 120 degree arc centered around drive line 140*c* (i.e., D3).

At decision block 902, a check may be performed to determine when a touch has been received. The check may be performed using any appropriate method and/or apparatus to meet the design criteria of a particular application, such as a "wake on change" line, by examining two different voltage measurements in rapid succession, and/or the like. The method 900 generally falls through to step 904 when a touch has been received (i.e., the YES leg of decision block 902). Otherwise, the method 900 generally returns to decision block 902.

At step 904, the zone corresponding to the touch point may be determined. Determining the zone containing the touch point generally provides an indication of the drive line that is most proximate the touch point. One or more voltage measurements may be performed to determine the zone corresponding to the touch point. For example, in one embodiment of the present invention, the following three voltage measurements may be performed to determine the zone corresponding to the touch point:

Set drive lines D2 and D3 high (e.g., five Volts applied to drive lines D2 and D3, etc.) and drive line D1 low (e.g., drive line D1 may be set to ground, etc). Measure the voltage between the sense line, such as the sense line 130, (i.e., the touch point) and a reference voltage such as D1. The measured voltage may be defined as V1 as shown in FIG. 7.

Set drive lines D1 and D3 high and drive line D2 low. Measure the voltage between the sense line (i.e., the touch point) and a reference voltage such as D2. The measured voltage may be defined as V2 as shown in FIG. 7.

Set drive lines D1 and D2 high and drive line D3 low. Measure the voltage between the sense line (i.e., the touch point) and a reference voltage such as D3. The measured voltage may be defined as V3 as shown in FIG. 7.

The zone corresponding to the touch point may be determined using the following algorithm:

If (V1$\leq$V2) and (V1$\leq$V3) then the zone corresponding to the touch point is Zone 1. Accordingly, D1 is the drive line most proximate (i.e., closest to) the touch point.

If (V1$\leq$V2) and (V1>V3) then the zone corresponding to the touch point is Zone 3. Accordingly, D3 is the drive line most proximate the touch point.

If (V1>V2) and (V2<V3) then the zone corresponding to the touch point is Zone 2. Accordingly, D2 is the drive line most proximate the touch point.

If (V1>V2) and (V2$\geq$V3) then the zone corresponding to the touch point is Zone 3. Accordingly, D3 is the drive line most proximate the touch point.

It should be understood that while the above equations define the boundary points between adjacent zones as belonging to one of the adjacent zones through the use of $\leq$ (i.e., less than or equal to) and $\geq$ (i.e., greater than or equal to) symbols, substantially similar algorithms may be implemented within the spirit and scope of the present invention that place the boundary points in the other adjacent zone.

By determining the drive line most proximate the touch point, effects of a dead zone associated with the drive line may be reduced and/or eliminated by using the other two drive lines to measure the position of the touch point.

At step 906, a voltage corresponding to the touch point may be determined by applying a voltage across the two drive lines farthest from the touch point (i.e., applying a potential across a first remote conductive drive line and a second remote conductive drive line) and measuring the voltage (i.e., sense voltage) between the sense line (i.e., the touch point) and a reference voltage (e.g., a drive line set low). For example, when step 904 indicates that the touch point is disposed within zone 1 (i.e., D1 is the drive line closest to the touch point), a voltage (i.e., potential) may be placed across D2 and D3 (i.e., the two drive lines farthest from the point of touch). In particular, D1 may be configured as an input such that D1 is generally electronically disconnected from the sensor. D3 may be set low (e.g., to ground, etc.) and D2 may be set high (e.g., 5 Volts, 10 Volts, etc.). The voltage between the sense line and D3 may be measured and defined as the sense voltage (i.e., Vtheta).

In at least one embodiment of the present invention, the angular resolution of the measurement of Vtheta may be improved by taking several measurements corresponding to the voltage between the sense line and the reference voltage (i.e., D3) and averaging and/or accumulating measurement values.

At decision block 908, a validity check may be performed to determine if the value of Vtheta is valid (i.e., to determine if the touch point is valid). In general, the validity check may be performed by reversing the reference voltage between the two drive lines farthest from the touch point. In the exemplary embodiment described above, the validity check may be performed by setting D2 low and D3 high. The voltage between the sense line and D2 may be measured and defined as Vtheta_ inv. In one embodiment, the touch point may be determined to be valid when the value of Vtheta added to the value of Vtheta_inv (i.e., Vtheta+Vtheta_inv)is within a predetermined range of the potential across D2 and D3 (e.g., voltage at D2 – voltage at D3). Otherwise, the touch point may be determined to be invalid. In another embodiment, an Analogue to Digital Converter (i.e., ADC) may be used to translate each voltage (i.e., Vtheta and Vtheta_inv) into a positive number of counts and the voltage applied between the two drive lines farthest from the touch point (i.e., a 240 degree arc) may correspond to $(2N)-1$ counts, wherein N equals the number of bits corresponding to the ADC (e.g., 255 counts when N=8). Accordingly, the touch point may be determined to be valid when the value of Vtheta+Vtheta_inv is within a predetermined range of $(2N)-1$ counts (e.g., 255 counts when N=8). Otherwise, the touch point may be determined to be invalid. It should be understood that other similar validity checks may be performed within the spirit and scope of the present invention. The method 900 generally falls through to step 910 when the touch point is valid (i.e., the YES leg of decision block 908). Otherwise, the method 900 may return to step 902 (i.e., the NO leg of decision block 908).

At step 910, an angle (i.e., an angular position) corresponding to the touch point (i.e., TP_angle) may be determined. The angle may be defined in degrees. In at least one embodiment, the position of D2 may be defined as 0 degrees, D3 as 120 degrees and D1 as 240 degrees. Using the value of Vtheta and the voltage span between the two drive lines farthest from the touch point (e.g., vD2-vD3 in the above exemplary embodiment) the angle of the touch point may be determined using the following algorithm:

$$TP\_angle = ((Vtheta*240)/(vD2-vD3)) + offset$$

Optionally, an ADC may be implemented such that the value of Vtheta is converted into a number of counts. When the ADC is configured to apply $(2N)-1$ counts over the voltage span between the two drive lines (separated by 240 degrees) farthest from the touch point (e.g., vD2-vD3 in the above exemplary embodiment), TP_angle may be determined using the following algorithm:

$$TP\_angle = (Vtheta*(240/((2N)-1))) + offset$$

In particular, when the ADC is configured to apply 255 counts over the voltage span between the two drive lines (separated by 240 degrees) farthest from the touch point (e.g., vD2-vD3 in the above exemplary embodiment), TP_angle may be determined using the following algorithm:

$$TP\_angle = (Vtheta*(240/256)) + offset$$
$$= (Vtheta*(15/16)) + offset$$

Wherein, the 255 counts may be approximated by the value 256 in order to achieve a simplified ratio of 15/16.

The value of offset may be defined for the above exemplary embodiments as follows:
- offset=120 degrees when the zone corresponding to the touch point is Zone 1;
- offset=240 degrees when the zone corresponding to the touch point is Zone 2; and
- offset=0 degrees when the zone corresponding to the touch point is Zone 3.

In at least one embodiment, multiple voltage readings and/or angular positions may be determined and averaged such that the accuracy of the angle corresponding to the touch point may be increased.

In general, multiple readings that are substantially dissimilar (i.e., the readings differ by a predetermined amount) may indicate that the touch point may span and/or be substantially near zero degrees. Similarly, when an initial voltage reading subtracted from an average of multiple readings generates a value greater than a predetermined value, the touch point may be deemed to span and/or be substantially near zero degrees.

When the touch point spans and/or is substantially near zero degrees, 360 degrees may be added to values of TP_angle that are less than a predetermined threshold. The average (i.e., TP_angle_avg) of the multiple TP_angle values, as modified, may then be determined. If the value of TP_angle_avg is greater than 360 degrees, then 360 degrees may be subtracted from TP_angle_avg to generate the final multiple TP_angle (i.e., TP_angle_mul) value. If the value of TP_angle_avg is not greater than 360 degrees, then the value of TP_angle_mul may be set to the value of TP_angle_avg.

It is to be understood that various labels (e.g., D1, D2, D3, zone 1, zone 2, zone 3, 140*a*, 140*b*, 140*c*, etc.) have been applied to various structures of the above described invention to further enable one skilled in the art to practice the invention. Any structure may be defined as any appropriate label in accordance with the present invention. Furthermore, while the present invention has been described with reference to an exemplary embodiment wherein the touch point resided in zone 1 and zero degrees (i.e., the zero point) was defined as the location of D2, similar steps may be performed to determine the angle (i.e. position) of any touch point residing in any zone and with reference to any zero point.

In accordance with various embodiments of the present invention, the methods described herein are intended for operation as software programs running on a processor (e.g., the processor 170 shown in FIG. 8). Dedicated hardware implementations including, but not limited to, application specific integrated circuits, programmable logic arrays and other hardware devices can likewise be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An annular touch sensor comprising:
   a bottom substrate;
   an annular pattern of resistive material traversing a portion of a top surface of the bottom substrate;
   a plurality of conductive drive lines, each conductive drive line radially traversing the top surface of the bottom substrate so as to be electrically coupled with the annular pattern of resistive material;
   a plurality of fixed potential conductive traces, each fixed potential conductive trace radially traversing the top surface of the bottom substrate and electrically coupled with the annular pattern of resistive material;
   a conductive sense line having a plurality of conductive sense traces, each sense trace electrically decoupled from the annular pattern of resistive material, the fixed potential conductive traces, and the drive lines when the sensor is untouched, and each sense trace radially traversing the top surface of the bottom substrate;
   a top substrate spaced above the top surface of the bottom substrate;
   a conductive layer on a bottom surface of the top substrate, the conductive layer positioned above one or more of the annular pattern, the fixed potential conductive traces, and the conductive sense traces;
   wherein a pressure applied to at least one of the top substrate and the bottom substrate electrically couples a portion of one or more of the conductive sense traces to a portion of at least one of the annular pattern and one or more of the fixed potential conductive traces; and
   a processor in electrical communication with the conductive sense line and the plurality of conductive drive lines, the processor operative to:
      determine a conductive drive line closest to the applied pressure;
      apply a potential across a first remote conductive drive line and a second remote conductive drive line, wherein the first and second remote conductive drive lines are electronically distinct from the conductive drive line closest to the applied pressure;
      measure a sense voltage between the conductive sense line and one of the first and second remote conductive drive lines; and
      determine an angular position of the applied pressure about the touch sensor using the sense voltage.

2. The annular touch sensor of claim 1 wherein the conductive sense traces are interleaved with the fixed potential conductive traces.

3. The annular touch sensor of claim 1 wherein an edge of the annular pattern of resistive material is adjacent an edge of the bottom substrate.

4. The annular touch sensor of claim 1 wherein the plurality of conductive drive lines are spaced substantially equidistant about the annular pattern of resistive material.

5. The annular touch sensor of claim 1 wherein the plurality of conductive drive lines consists of three conductive drive lines.

6. The annular touch sensor of claim 5 wherein the three conductive drive lines are spaced substantially equidistant about the annular pattern of resistive material.

7. The annular touch sensor of claim 1 further comprising an adhesive spacer layer between the bottom substrate and the top substrate, the adhesive spacer layer adhering the bottom substrate to the top substrate in a spaced apart manner.

8. The annular touch sensor of claim 1 further comprising a rear adhesive on a bottom surface of the bottom substrate for attaching the bottom substrate to a host device.

9. The annular touch sensor of claim 1 further comprising an outer protective layer adhered to a top surface of the top substrate layer.

10. An annular touch sensor comprising;
    a bottom substrate;
    an annular pattern of resistive material traversing a portion of a top surface of the bottom substrate;
    a plurality of conductive drive lines, each conductive drive line radially traversing the top surface of the bottom substrate so as to be electrically coupled with the annular pattern of resistive material;

a plurality of fixed potential conductive traces, each fixed potential conductive trace radially traversing the top surface of the bottom substrate and electrically coupled with the annular pattern of resistive material;

a conductive sense line having a plurality of conductive sense traces, each sense trace electrically decoupled from the annular pattern of resistive material, the fixed potential conductive traces, and the drive lines when the sensor is untouched, and each sense trace radially traversing the top surface of the bottom substrate;

a top substrate spaced above the top surface of the bottom substrate;

a conductive layer on a bottom surface of the top substrate, the conductive layer positioned above one or more of the annular pattern, the fixed potential conductive traces, and the conductive sense traces;

wherein a pressure applied to at least one of the top substrate and the bottom substrate electrically couples a portion of one or more of the conductive sense traces to a portion of at least one of the annular pattern and one or more of the fixed potential conductive traces; and a processor in electrical communication with the conductive sense line and the plurality of conductive drive lines, wherein the processor is operative to:

measure a first voltage between the conductive sense line and a first conductive drive line;

measure a second voltage between the conductive sense line and a second conductive drive line;

measure a third voltage between the conductive sense line and a third conductive drive line; and determine a conductive drive line closest to the pressure, wherein the conductive drive line closest to the pressure is determined using the first voltage, the second voltage, and the third voltage, and wherein the conductive drive line closest to the pressure is selected from a group consisting of the first conductive drive line, the second conductive drive line, and the third conductive drive line.

11. The annular touch sensor of clam 10 wherein the processor is further operative to:

electronically disconnect the conductive line closest to the pressure;

apply a potential across a first remote conductive drive line and a second remote conductive drive line wherein the first and second remote conductive drive lines are selected from the group consisting of the first conductive drive line, the second conductive drive line, and the third conductive drive line;

measure a sense voltage between the conductive sense line and one of the first and second remote conductive drive lines; and determine an angular position of the pressure about the annular touch sensor using the sense voltage.

12. The annular touch sensor of clam 11 wherein the sense voltage is measured using an Analogue to Digital Converter.

13. A method of determining an angular position of an applied pressure on a touch sensor having a top substrate including a conductive layer, and a bottom substrate including an annular pattern of resistive material, a plurality of fixed potential conductive traces electronically coupled to the annular pattern of resistive material, a plurality of conductive drive lines intersecting the annular pattern of resistive material, and a conductive sense line having a plurality of conductive sense traces, the method comprising: determining a conductive drive line closest to the applied pressure; applying a potential across a first remote conductive drive line and a second remote conductive drive line wherein the first and second remote conductive drive lines are electronically distinct from the conductive drive line closest to the applied pressure;

measuring a sense voltage between the conductive sense line and one of the first and second remote conductive drive lines; and determining an angular position of the applied pressure about the touch sensor using the sense voltage.

14. The method of claim 13 further comprising the step of determining when the sense voltage is valid.

15. The method of claim 14 wherein the step of determining when the sense voltage is valid comprises the steps of:

reversing the potential across the first remote conductive drive line and the second remote conductive drive line;

measuring an inverse sense voltage between the conductive sense line and one of the first and second remote conductive drive lines;

adding the sense voltage and the inverse sense voltage to generate a check voltage value; and defining the sense voltage as valid when the check voltage value is within a predetermined range of the potential across the first remote conductive drive line and the second remote conductive drive line.

16. The method of claim 15 wherein the sense voltage, the inverse sense voltage and the potential across the first remote conductive drive line and the second remote conductive drive line are measured using an Analogue to Digital Converter such that the sense voltage, the inverse sense voltage and the potential across the first and second remote conductive drive lines are represented as counts.

17. The method of claim 16 wherein the potential across the first and second remote conductive drive lines equals $(2^N)-1$ counts and N corresponds to a quantity of bits associated with the Analogue to Digital Converter.

18. A method of determining an angular position of an applied pressure on an annular touch sensor having a top substrate including a conductive layer, and a bottom substrate including an annular pattern of resistive material, a plurality of fixed potential conductive traces electronically coupled to the annular pattern of resistive material, a plurality of conductive drive lines intersecting the annular pattern of resistive material, and a conductive sense line having a plurality of conductive sense traces, the method comprising:

measuring a first voltage between the conductive sense line and a first conductive drive line;

measuring a second voltage between the conductive sense line and a second conductive drive line;

measuring a third voltage between the conductive sense line and a third conductive drive line;

determining a conductive drive line closest to the applied pressure, wherein the conductive drive line closest to the applied pressure is determined using the first voltage, the second voltage and the third voltage, and wherein the conductive drive line closest to the applied pressure is selected from a group consisting of the first conductive drive line, the second conductive drive line, and the third conductive drive line;

electronically disconnecting the conductive drive line closest to the applied pressure;

applying a potential across a first remote conductive drive line and a second remote conductive drive line wherein the first and second remote conductive drive lines are selected from the group consisting of the first conductive drive line, the second conductive drive line, and the third conductive drive line;

measuring a sense voltage between the conductive sense line and one of the first and second remote conductive drive lines; and determining an angular position of the applied pressure about the annular touch sensor using the sense voltage.

19. The method of claim 18 wherein a plurality of angular positions are determined and averaged to improve accuracy.

* * * * *